United States Patent [19]
Schorn

[11] Patent Number: 5,957,102
[45] Date of Patent: Sep. 28, 1999

[54] INTAKE SYSTEM FOR AN INTERNAL-COMBUSTION ENGINE

[75] Inventor: Juergen Schorn, Rutesheim, Germany

[73] Assignee: Dr. Ing. h.c.F. Porsche AG, Weissach, Germany

[21] Appl. No.: 09/013,936

[22] Filed: Jan. 27, 1998

[30] Foreign Application Priority Data

Feb. 12, 1997 [DE] Germany .............................. 197 05 273

[51] Int. Cl.$^6$ .................................................. F02B 27/00
[52] U.S. Cl. ...................................................... 123/184.57
[58] Field of Search ......................... 123/184.47, 184.57, 123/184.34

[56] References Cited

U.S. PATENT DOCUMENTS

| | | | |
|---|---|---|---|
| 4,444,013 | 4/1984 | Inoue et al. . | |
| 5,002,021 | 3/1991 | Nakata et al. ...................... | 123/184.57 |
| 5,040,495 | 8/1991 | Harada et al. . | |
| 5,161,492 | 11/1992 | Hitomi et al. . | |
| 5,307,767 | 5/1994 | Schutz ................................ | 123/184.57 |
| 5,417,195 | 5/1995 | Tachikawa et al. . | |
| 5,441,023 | 8/1995 | Thomas .............................. | 123/184.57 |
| 5,572,966 | 11/1996 | Doddy et al. ...................... | 123/184.57 |
| 5,628,287 | 5/1997 | Brackett et al. ................... | 123/184.57 |

FOREIGN PATENT DOCUMENTS

| | | |
|---|---|---|
| 0 376 299 | 7/1990 | European Pat. Off. . |
| 0 379 926 | 8/1990 | European Pat. Off. . |
| 43 05 333 | of 0000 | Germany . |
| 31 36 824 | 6/1982 | Germany . |
| 196 00 515 | 7/1996 | Germany . |
| 03160152 | 7/1991 | Japan . |

*Primary Examiner*—Marguerite McMahon
*Attorney, Agent, or Firm*—Evenson, McKeown, Edwards & Lenahan, P.L.L.C.

[57] ABSTRACT

An intake system for an internal-combustion engine has an intake pipe with a throttle device, an air flow or air mass sensor and a filter device. In order to improve the quality of the measuring signal of the air flow or air mass sensor and to prevent subsequent signal corrections, a Helmholtz resonator is coupled to the intake pipe in the proximity of the air flow or air mass sensor which is tuned to the resonance frequency occurring during the operation of the internal-combustion engine. By coupling the Helmholtz resonator in the area of the air flow or air mass sensor, fluctuations of the air flow are smoothed in this area.

11 Claims, 1 Drawing Sheet

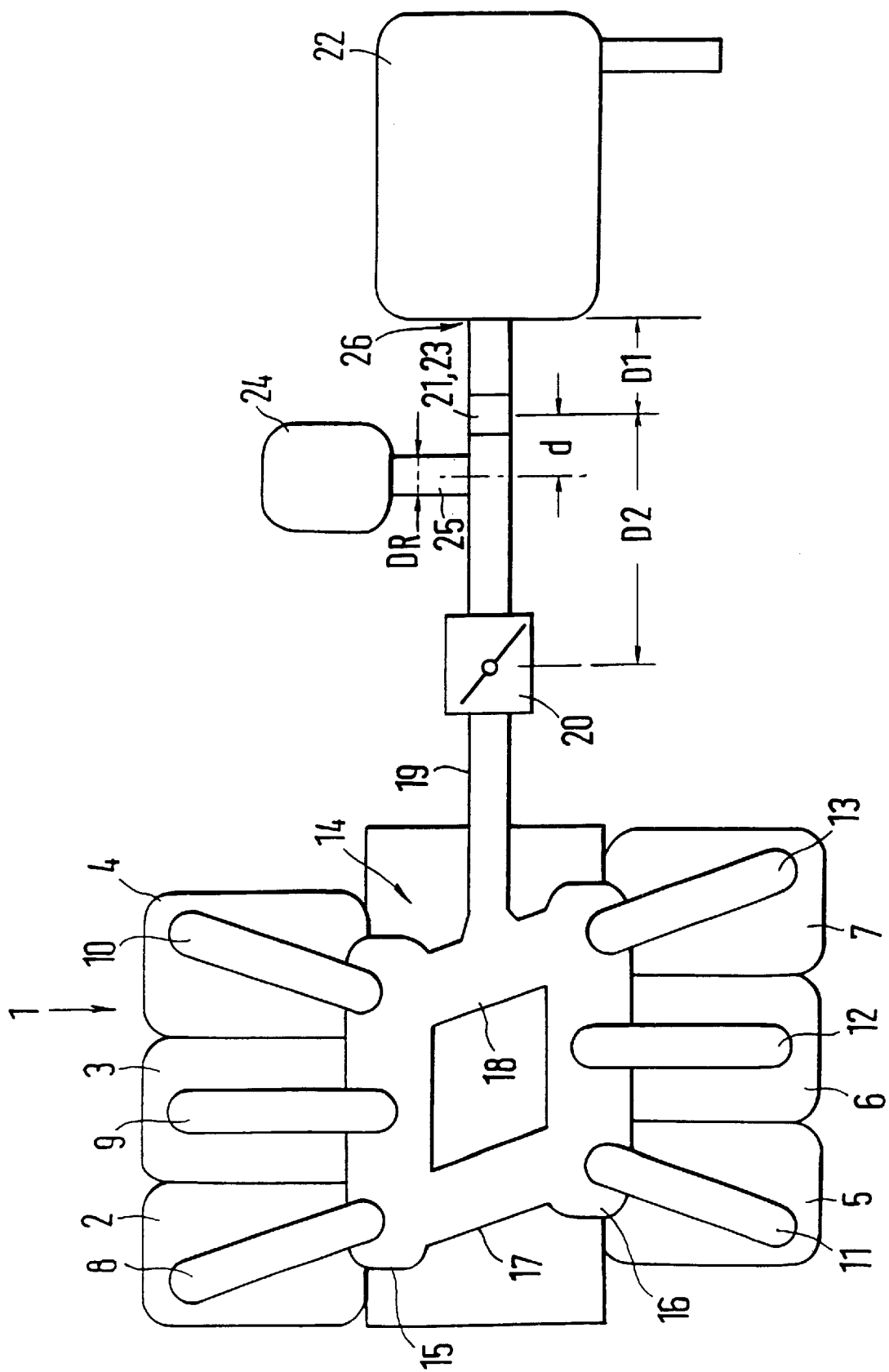

INTAKE SYSTEM FOR AN INTERNAL-COMBUSTION ENGINE

BACKGROUND AND SUMMARY OF THE INVENTION

This application claims the priority of German patent document 197 05 273.8 filed Feb. 12, 1997, the disclosure of which is expressly incorporated by reference herein.

The invention relates to an intake system for an internal-combustion engine.

An intake system for an internal-combustion engine having an intake pipe which is arranged between an air filter and a throttle device and in which an air flow sensor or air mass sensor is arranged is known, for example, from "Bosch Technische Unterrichtung", *Motor Management Motronic* 08.93. In order to achieve, in the case of such an intake system, a measuring signal of the air flow or air mass sensor which has a high measuring precision, flow conditions are required in the area of the air flow or air mass sensors which are as uniform as possible over the whole rotational speed range of the internal-combustion engine. Resonance vibrations which occur within the intake system affect, among other influence factors, the flow conditions at this air flow or air mass sensor. If additional control flaps are used in an intake system of this type for an adaptation to different operating conditions, this leads to further influences on the flow conditions which affect the quality of the measuring signal. In the case of intake systems of this type, occurring measuring errors or measuring inaccuracies because of strong air pulsations in the intake pipe are therefore compensated by a pulsation correction in the analysis unit of the measuring signal.

From German Patent Document DE-A-34 16 950, an intake system for an internal-combustion engine is known in the case of which a resonance container is arranged in parallel to the intake pipe between the air filter and the throttle device. This resonance tube has a first connection with the intake pipe just behind the air filter and can be coupled once more with the intake pipe in the proximity of the throttle device by way of a controllable opening. An intake system of this type increases power by a better utilization of the dynamic effects within the intake system and reduces the intake noise.

In contrast, the present invention is based on the object of improving an intake system for internal-combustion engines of the above-mentioned type such that the quality of the measuring signal of the air flow or air mass sensor is improved. In this case, disturbing influences as the result of non-uniform flow conditions in the area of the air flow or air mass sensor are to be reduced so that a subsequent correction of the measuring signal will not be necessary or will be required only to a very minor extent.

This and other objects have been achieved according to the present invention by providing an intake system for an internal-combustion engine having an intake pipe which extends between an air filter and a throttle device, and having an air flow or air mass sensor which is inserted in the intake pipe at a distance D1 from the air filter and at a distance D2 from the throttle device, wherein a Helmholtz resonator is coupled to the intake pipe proximate the air flow or air mass sensor and is tuned to the resonance frequency of the intake pipe occurring during operation of the internal-combustion engine, a distance d of the Helmholtz resonator from the air flow or air mass sensor being less than 0.5×D1 or 0.5×D2.

This and other objects have also been achieved according to the present invention by providing a method of arranging a Helmholtz resonator in an intake system having an intake pipe extending between an air filter and a throttle device, and an air flow or air mass sensor arranged in the intake pipe at a distance D1 from the air filter and at a distance D2 from the throttle device, said Helmholtz resonator being tuned to the resonance frequency of the intake pipe, said method comprising: coupling the Helmholtz resonator to the intake pipe at a distance d from the air flow or air mass sensor, wherein the distance d is less than 0.5×D1 and is less than 0.5×D2.

By coupling a Helmholtz resonator tuned to the resonance frequency occurring in the intake pipe during the operation of the internal-combustion engine to the intake pipe in the proximity of the air flow or air mass sensor, a very precise and uniform measuring signal will be obtained if the distance of the Helmholtz resonator from the air flow or air mass sensor, as a function of the installation position, is smaller than half the distance of the air mass sensor either from the air filter or from the throttle device. By positioning the Helmholtz resonator in the direct proximity of the air flow or air mass sensor, the influence of resonance vibrations within the intake pipe on the measuring signal can clearly be reduced so that a subsequent correction will not be necessary or will be required only to a very minor extent.

If the distance between the connection of the Helmholtz resonator to the intake pipe and the air flow or air mass sensor is selected such that it is greater than or equal to 1.5 times the diameter of the resonator connection, the quality of the measuring signal will clearly be improved again because the influence of the vibrations which may form in the resonator connection is very slight.

Furthermore, the quality of the measuring signal generated in the air flow or air mass sensor will clearly be improved if the coupling of the Helmholtz resonator to the intake pipe is situated in the area of a vibration loop of the resonance frequency of the intake pipe occurring in the operation of the internal-combustion engine.

A particularly uniform measuring signal is achieved if the coupling of the Helmholtz resonator to the intake pipe is arranged in the area of the first vibration loop of the resonance frequency of the intake pipe occurring in the operation of the internal-combustion engine, the distance of the vibration loop being greater than or equal to 1.5 times the diameter of the resonator connection.

Other objects, advantages and novel features of the present invention will become apparent from the following detailed description of the invention when considered in conjunction with the accompanying drawings.

BRIEF DESCRIPTION OF THE DRAWING

The drawing FIGURE show a schematic diagram of a preferred embodiment of the intake system according to the present invention.

DETAILED DESCRIPTION OF THE DRAWING

Referring to the drawing FIGURE, an example of one preferred embodiment of an intake system is shown as a two-bank internal-combustion engine 1 which is illustrated in a very simplified manner. The individual cylinders 2 of this internal-combustion engine are connected on the inlet side via intake ports 8 to 13 with a resonance intake system 14. In the resonance intake system 14 shown here as an example, the intake ports 8 to 10 and 11 to 13 of each cylinder bank are connected with a suction chamber 15, 16, respectively, which, in turn, are coupled with one another via two connection pipes 17 and 18. The connection pipe 18 is connected with an intake pipe 19. This intake pipe is connected with the ambient atmosphere via a throttle device 20, an air flow or air mass sensor known per se and an air filter arrangement 22. In the illustrated embodiment, the air flow or air mass sensor 21 is constructed as a tube-shaped hot-film air mass sensor which is known per se and in the following will be called an HFM-tube 23.

Between the throttling device 20 and the HFM-tube 23, a resonance container 24, which is constructed as a Helmholtz resonator, is coupled to the intake pipe 19 by way of a short connection piece 25. In a manner known per se, this Helmholtz resonator 24 is tuned to the resonance frequency which occurs in the intake pipe during the operation of the internal-combustion engine as a function of its rotational speed. The coupling of the Helmholtz resonator 24 to the intake pipe 19 takes place in the direct proximity of the HFM-tube 23. The distance d between the Helmholtz resonator 24 or its connection piece 25 and the HFM-tube 23 is smaller than half the distance D1 between the outlet side 26 of the filter device 22 and the HFM-tube 23. In contrast to this embodiment, it is also possible to couple the Helmholtz resonator 24 between the throttle device 20 and the HFM-tube 23 to the intake pipe 19. In this case, the distance d between the Helmholtz resonator 24 or its connection piece 25 and the HFM-tube 23 is selected such that it is smaller than half the distance D2 between the HFM-tube 23 and the throttle device 20.

In order to reduce or prevent the air vibrations in the connection piece 25, which may occur during the operation of the internal-combustion engine on the measuring signal, the distance d is greater than or equal to 1.5 times the diameter DR of the connection piece.

In order to obtain a particularly uniform measuring signal of the HFM-tube 23, the connection piece 25 is arranged such that it is situated in the area of a vibration loop of the resonance vibration of the intake pipe occurring during the operation of the internal-combustion engine. The resonance frequency of the intake pipe and the position of the vibration nodes and vibration loops are determined in a manner known per se during the design of the intake system.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An intake system for an internal-combustion engine having an intake pipe which extends between an air filter and a throttle device, and having an air flow or air mass sensor which is inserted in the intake pipe at a distance D1 from the air filter and at a distance D2 from the throttle device, wherein a Helmholtz resonator is coupled to the intake pipe proximate the air flow or air mass sensor and is tuned to the resonance frequency of the intake pipe occurring during operation of the internal-combustion engine, a distance d of the Helmholtz resonator from the air flow or air mass sensor being less than 0.5×D1 or 0.5×D2.

2. An intake system according to claim 1, wherein the Helmholtz resonator is connected via a resonator connection with the intake pipe which has an effective diameter DR, the distance d being greater than or equal to 1.5×DR.

3. An intake system according to claim 1, wherein the distance d is dimensioned such that the coupling of the Helmholtz resonator to the intake pipe is arranged in the area of a vibration loop of the resonance frequency of the intake pipe which occurs during the operation of the internal-combustion engine.

4. An intake system according to claim 2, wherein the distance d is dimensioned such that the coupling of the Helmholtz resonator to the intake pipe is arranged in the area of a vibration loop of the resonance frequency of the intake pipe which occurs during the operation of the internal-combustion engine.

5. An intake system according to claim 3, the Helmholtz resonator is coupled to the intake pipe proximate the first vibration loop whose distance to the air flow or air mass sensor is greater than or equal to 1.5×DR.

6. An intake system according to claim 4, the Helmholtz resonator is coupled to the intake pipe proximate the first vibration loop whose distance to the air flow or air mass sensor is greater than or equal to 1.5×DR.

7. An intake system according to claim 1, wherein the Helmholtz resonator is arranged between the air flow or air mass sensor and the throttle device.

8. An arrangement of a Helmholtz resonator in an intake pipe, comprising:

an intake pipe extending between an air filter and a throttle device;

an air flow or air mass sensor arranged in said intake pipe at a distance D1 from the air filter and at a distance D2 from the throttle device;

a Helmholtz resonator coupled to the intake pipe at a distance d from the air flow or air mass sensor, said Helmholtz resonator being tuned to the resonance frequency of the intake pipe, wherein the distance d is less than 0.5×D1 and is less than 0.5×D2.

9. An intake system according to claim 8, wherein the Helmholtz resonator is coupled to the intake pipe via a resonator connection piece which has an effective diameter DR, the distance d being greater than or equal to 1.5×DR.

10. A method of arranging a Helmholtz resonator in an intake system having an intake pipe extending between an air filter and a throttle device, and an air flow or air mass sensor arranged in the intake pipe at a distance D1 from the air filter and at a distance D2 from the throttle device, said Helmholtz resonator being tuned to the resonance frequency of the intake pipe, said method comprising:

coupling the Helmholtz resonator to the intake pipe at a distance d from the air flow or air mass sensor, wherein the distance d is less than 0.5×D1 and is less than 0.5×D2.

11. A method according to claim 10, further comprising the step of coupling the Helmholtz resonator to the intake pipe via a resonator connection piece which has an effective diameter DR, the distance d being greater than or equal to 1.5×DR.

* * * * *